United States Patent
Nakabayashi et al.

(10) Patent No.: US 8,959,667 B2
(45) Date of Patent: Feb. 24, 2015

(54) HEAD-MOUNTABLE APPARATUS

(75) Inventors: Takaaki Nakabayashi, Kawasaki (JP);
Toshiyuki Yasuda, Yokohama (JP);
Toshiki Ishino, Hiratsuka (JP);
Yoshihiro Saito, Hachioji (JP);
Toshiyuki Okuma, Chofu (JP);
Kazuhide Miyata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 553 days.

(21) Appl. No.: 12/813,190

(22) Filed: Jun. 10, 2010

(65) Prior Publication Data

US 2010/0327028 A1 Dec. 30, 2010

(30) Foreign Application Priority Data

Jun. 26, 2009 (JP) ................. 2009-152869

(51) Int. Cl.
*B65H 75/40* (2006.01)
*A45F 5/00* (2006.01)
*G02B 27/01* (2006.01)
*A42B 1/24* (2006.01)

(52) U.S. Cl.
CPC ............ *G02B 27/0176* (2013.01); *A42B 1/247* (2013.01)
USPC ....................... 2/417; 2/418; 2/421

(58) Field of Classification Search
CPC .......... A42B 3/145; A42B 1/064; A42B 1/20; A42B 3/125; A42B 3/127; A42B 3/324; A42B 3/14; A42B 3/003; A42B 3/00; A63B 71/10
USPC ............. 2/410, 411, 412, 414, 416, 417, 418, 2/419, 420, 421, 422; 345/8
See application file for complete search history.

(56) References Cited

U.S. PATENT DOCUMENTS

| | | | | |
|---|---|---|---|---|
| 2,213,118 A | * | 8/1940 | Bowers | 2/8.1 |
| 2,747,191 A | * | 5/1956 | Hoffmaster | 2/8.1 |
| 3,028,602 A | * | 4/1962 | Miller | 2/6.1 |
| 3,130,415 A | * | 4/1964 | Colley | 2/415 |
| 3,864,756 A | * | 2/1975 | Desimone | 2/423 |
| 5,042,177 A | * | 8/1991 | Schoch | 36/50.5 |
| 5,321,416 A | | 6/1994 | Bassett et al. | |
| 5,572,749 A | * | 11/1996 | Ogden | 2/421 |
| 5,671,037 A | | 9/1997 | Ogasawara et al. | |

(Continued)

FOREIGN PATENT DOCUMENTS

| | | |
|---|---|---|
| JP | 08-086974 | 4/1996 |
| JP | 10-123452 | 5/1998 |
| JP | 2009-111513 A | 5/2009 |

OTHER PUBLICATIONS

Oct. 4, 2010 European Search Report of the counterpart European Patent Application No. 10167411.7.

(Continued)

*Primary Examiner* — Katherine Moran
*Assistant Examiner* — Katharine Gracz
(74) *Attorney, Agent, or Firm* — Cowan, Liebowitz & Latman, P.C.

(57) ABSTRACT

A head-mountable apparatus mountable on a head of an observer comprises a first pressing member which presses a first portion of the head; a second pressing member which presses a second portion of the head; and an adjustment unit adapted to move the first pressing member and the second pressing member to positions where the first pressing member and the second pressing member respectively press the first portion and the second portion.

18 Claims, 8 Drawing Sheets

(56) References Cited

U.S. PATENT DOCUMENTS

| | | | |
|---|---|---|---|
| 5,715,023 A | 2/1998 | Hoppe | |
| 5,983,405 A * | 11/1999 | Casale | 2/421 |
| 6,256,798 B1 * | 7/2001 | Egolf et al. | 2/421 |
| 7,120,939 B1 * | 10/2006 | Howard et al. | 2/416 |
| 8,237,627 B2 * | 8/2012 | Nakabayashi et al. | 345/8 |
| 2001/0022005 A1 * | 9/2001 | Sasaki et al. | 2/421 |
| 2003/0115661 A1 | 6/2003 | Dobbie et al. | |
| 2005/0247813 A1 * | 11/2005 | Kovacevich et al. | 242/388.6 |
| 2006/0015988 A1 * | 1/2006 | Philpott et al. | 2/410 |
| 2007/0050898 A1 * | 3/2007 | Larson et al. | 2/456 |
| 2007/0089221 A1 * | 4/2007 | Manzella et al. | 2/456 |
| 2007/0135279 A1 * | 6/2007 | Purdy et al. | 482/124 |
| 2007/0266481 A1 * | 11/2007 | Alexander et al. | 2/414 |
| 2009/0066607 A1 * | 3/2009 | Yasuda et al. | 345/8 |
| 2009/0128450 A1 | 5/2009 | Nakabayashi et al. | |
| 2010/0050324 A1 * | 3/2010 | Musal | 2/417 |
| 2011/0167543 A1 * | 7/2011 | Kovacevich et al. | 2/417 |

OTHER PUBLICATIONS

Jan. 8, 2013 Japanese Office Action, without English Translation, that issued in Japanese Patent Application No. 2009-152869.

* cited by examiner

HEAD-MOUNTABLE APPARATUS

BACKGROUND OF THE INVENTION

1. Field of the Invention

The present invention relates to a head-mountable apparatus.

2. Description of the Related Art

As a device that is mounted on a head during use, a head-mountable display is well-known. A head-mountable display is commonly used since it allows an observer to readily view a video picture on a large screen, allows for easy stereoscopic vision, and is movable together with the observer. As a mounting mechanism of the head-mountable display, a mechanism which tightens around a surrounding portion of the head by a belt-like member, and a mechanism which includes frontal and occipital pressing members, and allows attachment/detachment of the head-mountable display by pressing or releasing the occipital pressing member against or from the head by moving that member in the back-and-forth directions are well-known.

When an observer moves the head from side to side and up to down, a display unit of the head-mountable display often deviates from a correct observation position. In order to reduce this deviation, a holding force to the head may be increased. However, only an increase in holding force makes the observer feel discomfort. Hence, a mounting mechanism which allows mounting by pressing temporal regions has been disclosed (see Japanese Patent Laid-Open No. 10-123452). Also, a mounting mechanism of a type that supports a weight on a parietal region and presses temporal regions has been disclosed (see Japanese Patent Laid-Open No. 08-086974).

Since the mounting mechanism disclosed in Japanese Patent Laid-Open No. 10-123452 presses the head of the observer at the frontal region and temporal regions, it has to strongly press the temporal regions so as to surely hold the weight of the head-mountable display. However, the strong pressing force on the temporal regions may lead to a feeling of discomfort.

The mounting mechanism disclosed in Japanese Patent Laid-Open No. 08-086974 does not allow any adjustment since it has no temporal adjustment members and depends on an elastic force of an elastic member. Hence, this mounting mechanism may not press the head at a comfortable pressing force for the observer.

In order to surely hold the head-mountable display on the head of the observer, a larger number of adjustment members may be provided to fit the head shape of the observer. However, when the number of adjustment members is merely increased in a conventional head-mountable display, the number of operation members corresponding to the adjustment members is increased, resulting in troublesome adjustment operations and an increase in size of the display.

SUMMARY OF THE INVENTION

The present invention provides, in consideration of the aforementioned problems, a head-mountable apparatus which allows an easy adjustment operation since the apparatus can be held using fewer adjustment units by efficiently actuating different pressing members using a single adjustment unit, and which allows size and weight to be reduced.

According to one aspect of the present invention, there is provided a head-mountable apparatus, forming a cavity into which the head of an observer is inserted in use, comprising: a first pressing member configured to be movable into the cavity, to apply pressure to a first portion of the head when in use; a second pressing member configured to be movable into the cavity, to apply pressure to a second portion of the head when in use; and a single adjustment unit adapted to adjust the pressure applied orthogonal to the head by both the first and second pressing members, to the head when in use, by moving the first pressing member and the second pressing member into the cavity, and wherein the first and second pressing members press on the head in directions that are essentially orthogonal to each other.

According to the present invention, since different pressing members can be efficiently actuated by a single adjustment unit, the head-mountable display can be held by fewer adjustment units. Also, an easy adjustment operation is allowed, and size and weight reductions of the display can be attained.

Further features of the present invention will become apparent from the following description of exemplary embodiments (with reference to the attached drawings).

DESCRIPTION OF THE EMBODIMENTS

Embodiments applicable to the present invention will be described in detail hereinafter. In the following embodiments, a head-mountable display is explained as one example of the head-mountable apparatus.

First Embodiment

Figure 1:
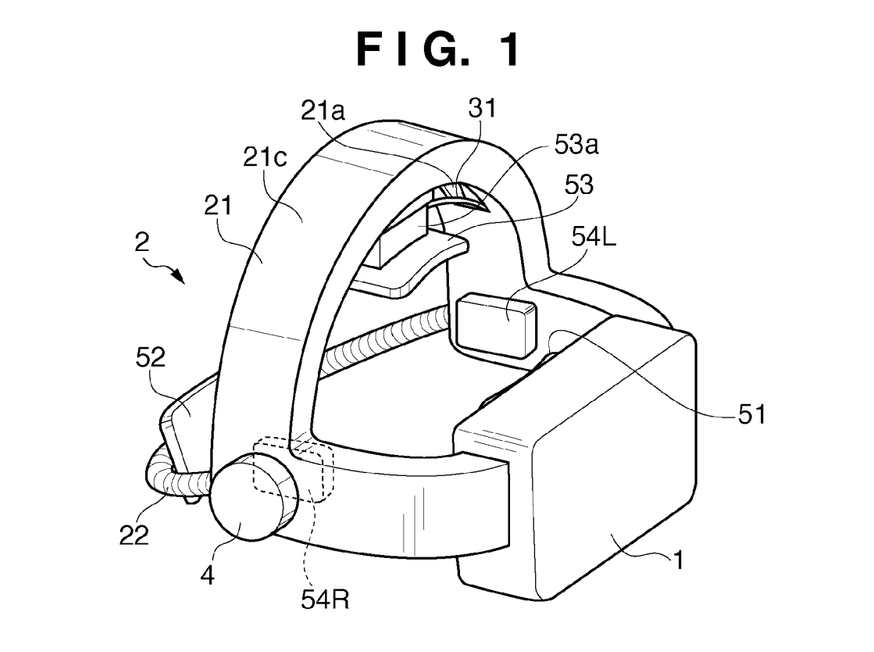
FIG. 1 is a perspective view of a head-mountable display according to the first embodiment.

The arrangement of a head-mountable display (to be abbreviated as "HMD" hereinafter) according to the first embodiment of the present invention will be described below with reference to FIG. 1. An HMD includes a display unit 1 required to present a video picture to an observer, and a head-mounting unit 2 required to hold the display unit 1 in front of the eyes of the observer. In the display unit 1, a display element which displays a video picture, and an optical system which enlarges the video picture of that display element and guides it to the eyes of the observer are arranged (neither are shown). The display unit 1 is attached to a rigid frame 21. The rigid frame has a shape that extends to right and left temporal regions along a surrounding portion of the head and steps over a parietal region. On the parietal region of the rigid frame 21, holes 21a and 21b required to position (lace) an elongate member such as a wire 31 are formed (see FIG. 2). An extendable elongate member such as a bellows-like or pleated elastic tube 22, which can be stretched and contracted, is attached to the rigid frame and surrounds (or extends around) the occipital region.

Figure 2:
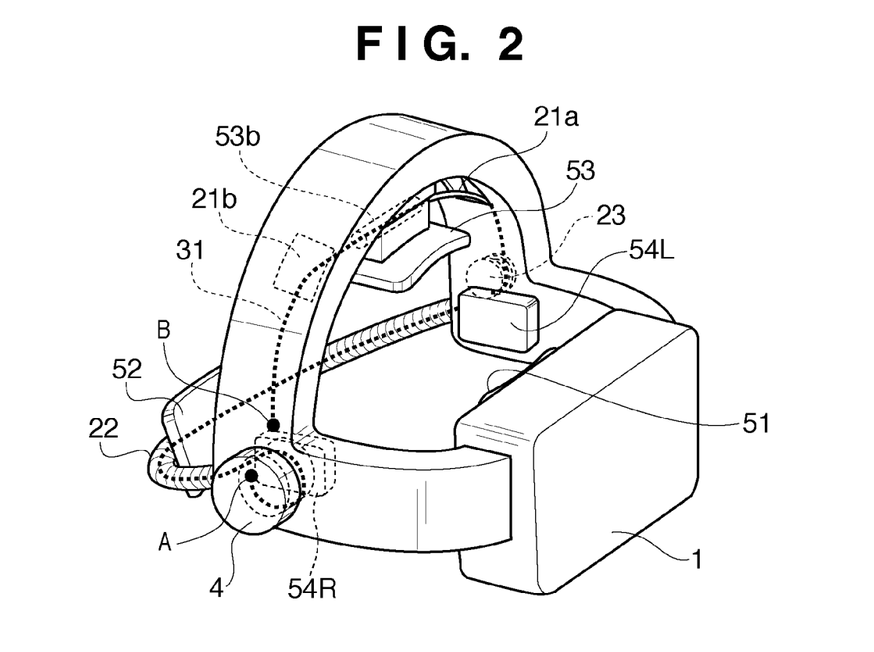
FIG. 2 is a perspective view of the head-mountable display to schematically show how to lace a wire according to the first embodiment.

A layout of the wire 31 will be described below with reference to FIG. 2. A holding member 23, which changes the moving direction of the wire 31 and holds the position of the wire 31, is provided to the left temporal region inside the rigid frame 21.

Figure 3:
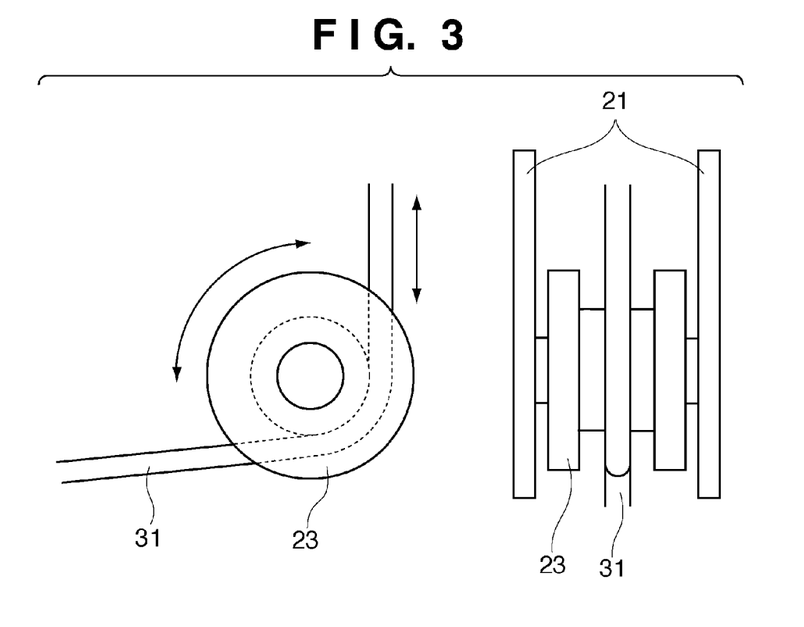
FIG. 3 is a schematic view of a holding member which converts the direction of the wire.

The arrangement of the holding member 23 will be described below with reference to FIG. 3. The holding member 23 is rotatably attached to the rigid frame 21, and smoothly rotates in synchronism with the movement of the wire 31. In addition to the holding member 23, a member that allows smooth movement of the wire 31 and restricts the position of the wire may be provided to another position. One end of the wire 31 is attached to an adjustment unit 4 (at a connecting point A), which is pivotally attached to the rigid frame 21, and the other end is attached to the rigid frame 21 (at a connecting point B). The wire 31 passes through the interior of the elastic tube 22 from the connecting point A of the adjustment unit 4, passes through the parietal region of the rigid frame from the left temporal region of the rigid frame 21 via the holding member 23, and is connected to the rigid frame at the connecting point B. The wire 31 temporarily extends outside the rigid frame 21 from the hole 21a formed on the rigid frame 21, passes through a parietal pad 53 (to be described later), and enters the rigid frame 21 again from the opposing hole 21b formed on the rigid frame 21. Then, the rigid frame 21 and wire 31 are attached at the connection point B.

A frontal pad 51, which presses a frontal region at the time of mounting, is attached to the display unit 1. An occipital pad 52 as a first pressing member, which is required to press an occipital region as a first portion of the head, is attached to the elastic tube 22. The parietal pad 53, required to press the parietal region, is attached to the parietal region of the rigid frame 21 and is arranged to be movable in the up-and-down directions with respect to the rigid frame 21. The parietal pad 53 is integrated with a parietal pad guide 53a which engages with a guide portion 21c provided to the rigid frame 21, and is restricted to move up and down in the head direction.

A through hole 53b required to lace the wire 31 is formed in the parietal pad guide 53a. On the inner side surfaces of the rigid frame 21, temporal pads 54 as second pressing members, which are required to press temporal regions as second portions of the head, are provided. The temporal pads 54 include right and left temporal pads 54R and 54L. The right temporal pad 54R is configured to be actuated by the adjustment unit 4 (to be described later). The left temporal pad 54L is fixed to the rigid frame 21.

Figure 4:
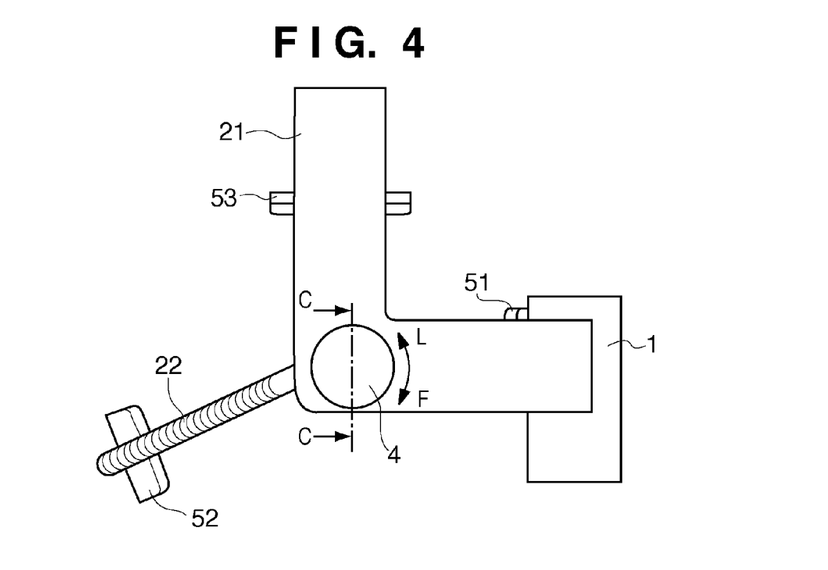
FIG. 4 is a side view of the head-mountable display according to the first embodiment.
Figure 5A:
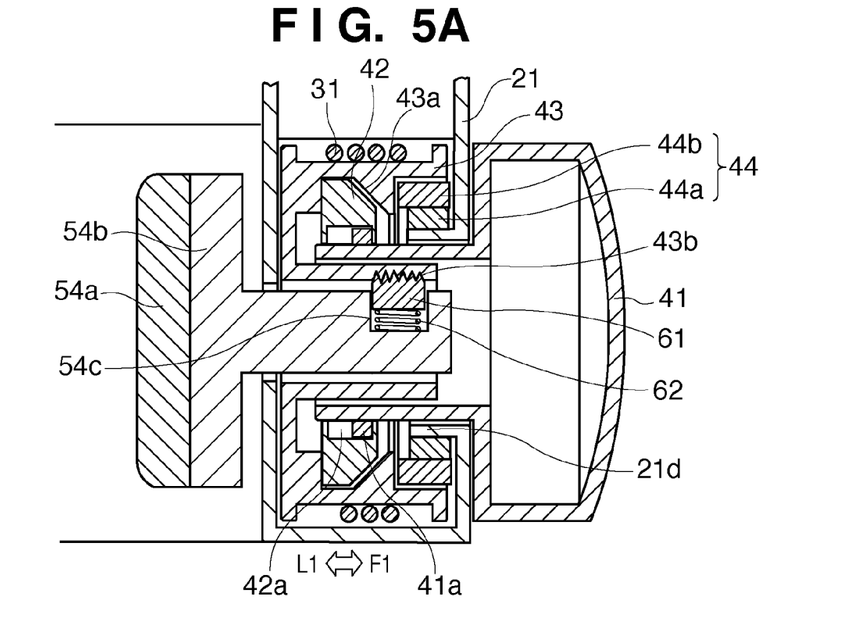
FIGS. 5A and 5B are sectional views taken along a line C-C in FIG. 4.
Figure 5B:
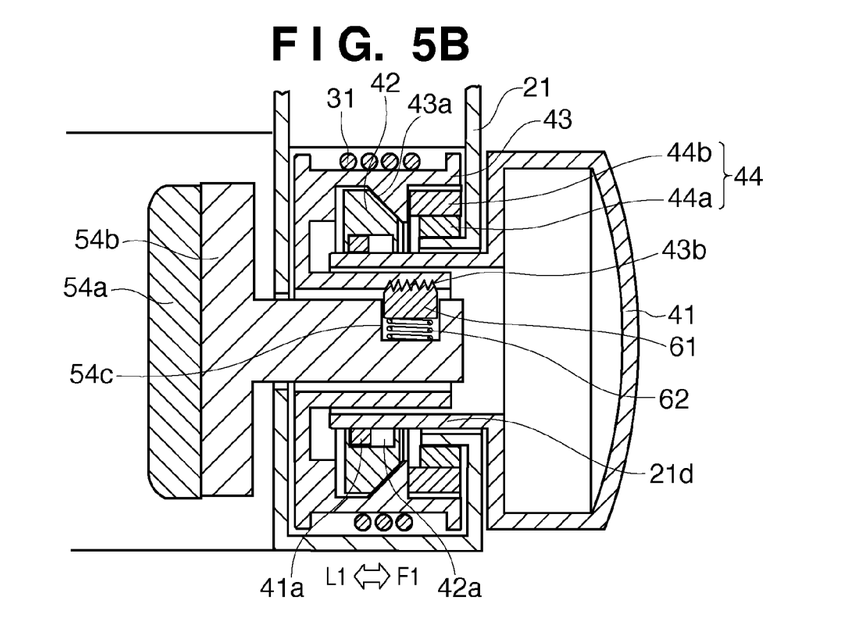

The adjustment unit 4 operable to adjust the length of the wire 31 will be described below with reference to FIG. 4 and FIGS. 5A and 5B. FIGS. 5A and 5B are sectional views of the adjustment unit 4 taken along a line C-C in FIG. 4. The adjustment unit 4 includes an operation member such as knob 41 operated by the observer, a clutch 42, a pulley 43, and a one-way clutch 44. The operation knob 41 has a cam shaft 41a. The clutch 42 has a cam groove 42a which fits with the cam shaft 41a. The cam groove 42a is formed with a groove (track) which makes the clutch 42 move in the horizontal direction upon rotation of the cam shaft 41a. When the operation knob 41 is rotated in a clockwise direction (F direction in FIG. 4), the clutch 42 moves to the F1 side (FIGS. 5A and 5B) upon rotation of the cam shaft 41a. On the other hand, when the operation knob 41 is rotated in a counterclockwise direction (L direction in FIG. 4), the clutch 42 moves to the L1 side (FIGS. 5A and 5B) upon rotation of the cam shaft 41a.

The pulley 43 has a frictional surface 43a, which contacts the clutch 42, and a threaded portion 43b that is interlocked with a temporal pad adjustment mechanism (to be described later). The frictional surface 43a is configured to have a frictional force that allows the rotation of the operation knob 41 to be transmitted to the pulley 43 when the clutch 42 moves to the F1 side and is pressed against the frictional surface 43a. The pulley 43 is attached to one end of the wire 31. The one-way clutch 44 includes a one-way clutch unit 44a and a pulley transmission unit 44b which meshes with the pulley 43 and receives a rotational force from the pulley 43. The one-way clutch unit 44a fits with a shaft 21d formed on the rigid frame 21, so as to allow the pulley transmission unit 44b to rotate in only one direction. When the operation knob 41 is rotated to the F side (FIG. 4), the clutch 42 moves to the F1 side by means of the cam shaft 41a and cam groove 42a. When the clutch 42 moves to the F1 side, it is brought into contact with the frictional surface 43a of the pulley 43. Furthermore, when the clutch 42 contacts the frictional surface 43a of the pulley 43, the pulley 43 moves in the horizontal direction, and meshes with the one-way clutch 44. The one-way clutch 44 allows a free rotation when the operation knob 41 is rotated to the F side, and restricts a rotation when the operation knob 41 is rotated to the L side. For this reason, the pulley 43 which meshes with the one-way clutch 44 is allowed to be rotated in only one direction, and its rotation is restricted in the reverse direction (to be referred to as a "lock state" hereinafter).

FIG. 5B shows the lock state. Conversely, when the operation knob 41 is rotated to the L side, the clutch 42 moves to the L1 side. When the clutch 42 moves to the L1 side, the pulley 43 also moves to the L1 side, and releases meshing with the one-way clutch 44, thus releasing a restriction of the rotation of the pulley 43 (to be referred to as a "free state" hereinafter). The attached wire 31 is taken up when the pulley 43 rotates in a free to rotate direction in the lock state.

Figure 6:
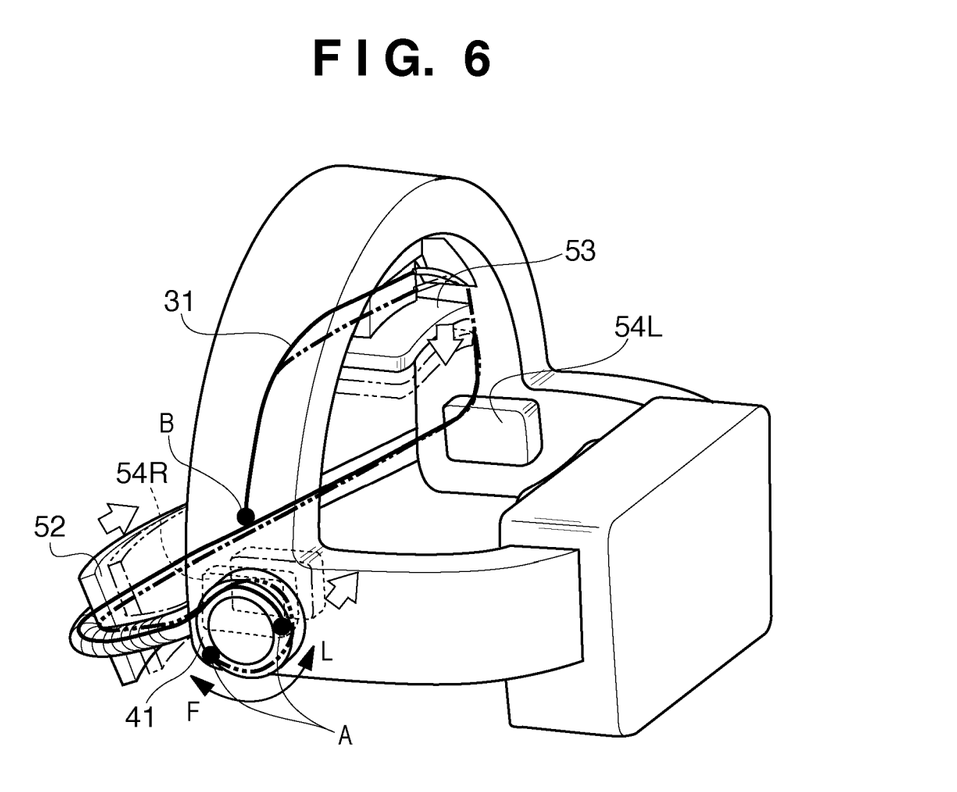
FIG. 6 is a schematic view of movements of respective pads as a result of a change in head surrounding length of the wire.

The movements of respective pads upon rotation of the operation knob 41 will be schematically described below with reference to FIG. 6. When the operation knob 41 is rotated to the F side, the wire 31 is taken up, and the head surrounding length of the wire 31 is shortened. Then, the elastic tube 22 is contracted, and the occipital pad 52 moves in the head direction of the observer. On the parietal region, since the wire 31 moves in the head direction of the observer, the pad 53 also moves in the head direction of the observer. That is, the wire 31 is taken up by the rotational force of the adjustment unit 4, and the occipital pad 52 which presses the occipital region and the parietal pad 53 which presses the parietal region move accordingly, thus respectively pressing the occipital and parietal regions of the observer. Since the pulley 43 is not reversed due to the function of the one-way clutch 44, the wire 31 remains taken up, and a pressing state is not canceled when the observer releases the operation knob 41. The wire 31 has a strength that can withstand a tension generated when the respective pads (to be described later) press the head, and may be, for example, a string or line.

The adjustment unit 4 also incorporates a mechanism for actuating the right temporal pad 54R. The right temporal pad 54R includes a cushion 54a required to press the head of the observer without any feeling of discomfort, and a temporal pad base 54b (see FIG. 5B). The temporal pad base 54b has a recess portion 54c which is formed to receive a claw 61 that meshes with the threaded portion 43b of the pulley 43. The temporal pad base 54b has a fitting shape having a rotation lock function with respect to the rigid frame 21. The rotational force of the pulley 43 is transmitted to the claw 61 via the threaded portion 43b. The claw 61 serves as a conversion mechanism which converts a rotation of the pulley 43 into a translation, and moves the temporal pad base 54b. The claw 61 is always pressed against the threaded portion 43b of the pulley 43 by a biasing spring 62.

When the operation knob 41 is rotated to the F side, the pulley 43 rotates by the aforementioned mechanism. Hence, the right temporal pad 54R having the claw 61, which meshes with the threaded portion 43b of the pulley 43, moves straight in the head direction of the observer. That is, the right temporal pad 54R moves by a linear force, which is obtained by converting, by the aforementioned conversion mechanism, the rotational force of the operation knob 41 provided to the adjustment unit 4 which serves as an adjustment unit, thus pressing the temporal region. Conversely, when the operation knob 41 is rotated to the L side to unlock the pulley 43, the pulley 43 rotates in the reverse direction by the tension of the wire 31. Then, the right temporal pad 54R also moves to the rigid frame 21 side (so towards the rigid frame), thus releasing the pressing force. The left temporal pad 54L (FIG. 6) provided to the left side of the rigid frame 21 is configured by a cushion-like member having a low repulsion force.

Figure 7A:
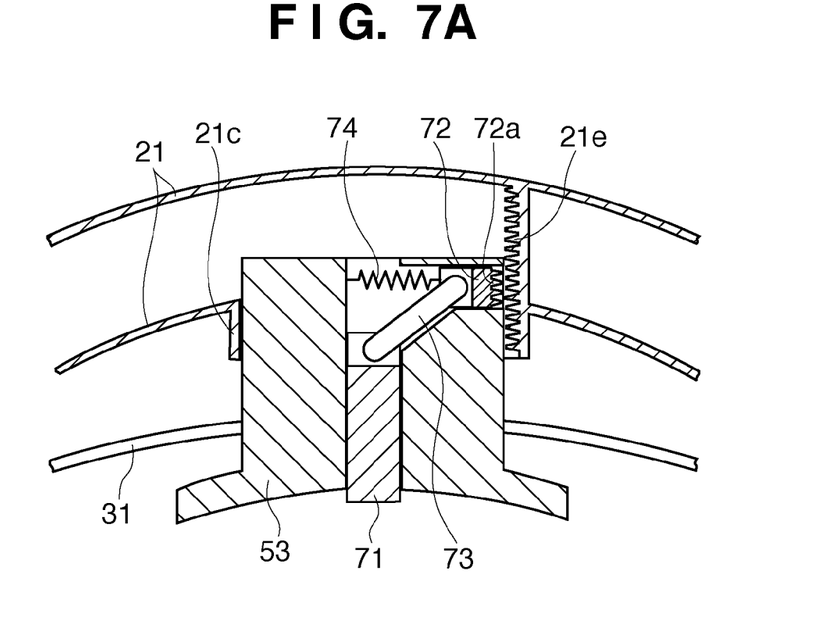
FIGS. 7A and 7B are views of a parietal pad holding mechanism.

The HMD according to this embodiment has a parietal pad holding mechanism used to hold the positions of the rigid frame 21 and parietal pad 53 at the time of mounting. The parietal pad holding mechanism provided to the parietal pad 53 will be described below with reference to FIGS. 7A and 7B. In the parietal pad 53, a lock switch 71, lock member 72, link 73, and tension spring 74 are arranged. The lock switch 71 is arranged to be allowed to move straight in the pressing direction of the parietal region (so towards the parietal region of the wearer). The lock member 72 is arranged to be allowed to move straight in a direction different from the pressing direction of the parietal region (lock direction), so in an opposite direction to the pressing direction. The lock member 72 has rack-like teeth 72a. The lock switch 71 and lock member 72 are combined to be movable via the link 73. The tension spring 74, which biases in a direction to release meshing of the teeth 72a (a direction opposite to the lock direction), is attached to the lock member 72. FIG. 7A shows a state when the HMD is not mounted, and the lock switch 71 projects from the parietal pad 53.

Figure 7B:
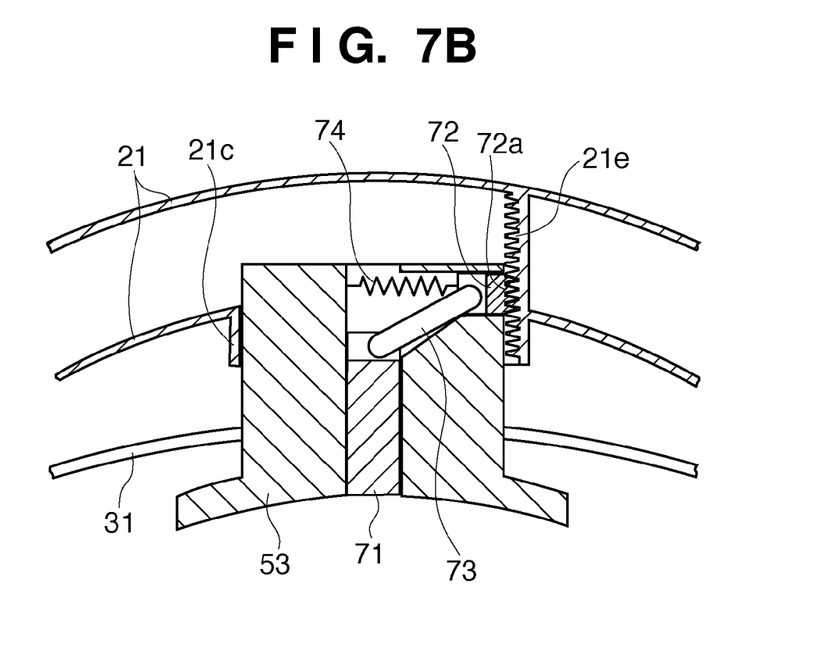

FIG. 7B shows a state when the HMD is mounted. When the observer tightens the HMD at a certain pressing force or more, the lock switch 71 is pressed in by the parietal region of the observer, and the lock member 72 is pushed out in the lock direction via the link 73. The rigid frame 21 has teeth 21e which mesh with the teeth 72a of the lock member 72. In a state in which the lock switch 71 is not pressed in, the parietal pad 53 has room to move up and down according to the length of the wire 31 with respect to the rigid frame 21. When the length of the wire 31 is shortened, and the parietal pad 53 presses the head of the observer, the lock switch 71 is pressed in. The lock member 72 is pushed out toward the rigid frame 21 side, and the teeth 72a of the lock member mesh with the teeth 21e of the frame, thus holding the position of the parietal pad 53. Conversely, when the force to press in the lock switch 71 is released, the lock member 72 is returned by the tension spring 74 in a direction opposite to the lock direction, and the lock switch 71 moves in the head direction of the observer. By adjusting a spring coefficient of the tension spring 74, a pressing force required to lock the parietal pad 53 can be adjusted.

The operations and functions at the time of mounting will be described below. The observer firmly grips the rigid frame 21, which extends on the right and left side of the head, by the left hand, and grips the operation knob 41 by the right hand. The observer then presses their frontal region against the frontal pad 51, and adjusts the display unit 1 to an easy to observe position. After the position is decided, the observer turns the operation knob 41 to the F side. In this case, the observer can operate the operation knob 41 without releasing both the hands from the HMD. For this reason, the observer can have their head pressed by the pressing members while holding the display unit 1 at the easy to observe position. When the wire 31 is taken up to shorten its length upon operation of the operation knob 41, the occipital pad 52 and parietal pad 53 move in the head direction at the same time. Also, the right temporal pad 54R which is arranged to be interlocked with the adjustment unit 4 moves in the head direction. In this case, the rigid frame 21 is not deformed since it has sufficient rigidity, and portions other than the pressing members are never tightened. The wire 31 passes through the interiors of the rigid frame 21 and elastic tube 22, and never directly touches the observer. When the observer further continues the operation, one of the right temporal pad 54R, left temporal pad 54L, occipital pad 52, and parietal pad 53 is brought into contact with the head.

The functions of the occipital pad 52 and parietal pad 53 will be described below. When one of the occipital pad 52 or parietal pad 53, right temporal pad 54R, and left temporal pad 54L is brought into contact with the head first, no pressing force is generated due to slack in the wire 31. When the observer further rotates the operation knob 41, and both the occipital pad and parietal pad are brought into contact with the head, a pressing force is generated to tighten the HMD on the head. Since the parietal pad 53 includes the aforementioned holding mechanism, it is locked when a certain pressing force acts. Therefore, when the observer further tightens, the parietal pad 53 does not move, and only the occipital pad 52 moves to press the occipital region. In this way, the HMD can be prevented from slipping upward and being detached from the head due to the excessive pressing force of the parietal pad 53. Also, the feeling of discomfort due to the force to slip upward and to be detached from the head can be reduced. Upon operation of the operation knob 41, the pulley 43 rotates in only a direction to shorten the wire 31, and the reverse rotation of the pulley 43 is locked. For this reason, when the observer releases the hand from the operation knob 41 after an appropriate pressing force to hold the HMD is applied, the pressing forces of respective pressing members are not eased.

The functions of the right temporal pad 54R will be described below. When the right temporal pad 54R is brought into contact with the observer, if the observer continues a pressing adjustment operation of the occipital region and parietal region, the head is sandwiched between the right and left temporal pads 54R and 54L, resulting in a high pressing force. However, since the resilience of the biasing spring 62 surrenders a reaction generated by the threaded portion 43b of the pulley and the claw 61, meshing of the claw 61 is disengaged. Therefore, when a predetermined reaction is generated, since the rotational force is not converted into the linear force, no discomfort force acts on the temporal regions of the observer. By adjusting a disengaging force of the claw 61 by adjusting the spring coefficient of the biasing spring 62, the pressing force of the right temporal pad 54R can also be adjusted.

When the observer requires the HMD to be detached, the observer turns the operation knob 41 to the L side. Upon rotation of the operation knob 41 to the L side, the clutch 42 moves in the L1 direction, and is separated from the frictional surface 43a of the pulley 43. The pulley 43 is separated from the one-way clutch 44, and is set to be free to rotate. The wire 31 taken up by the pulley 43 is stretched upon rotation of the pulley 43. As a result, the pressing force of the occipital pad 52 is eased, and the force to press in the lock switch 71 is also released. Then, the parietal pad 53 is unlocked and eased. Also, since the right temporal pad 54R is interlocked with the release of the occipital pad 52, it moves to the rigid frame 21 side and is eased.

In this embodiment, the parietal pad 53 includes the parietal pad holding mechanism. Alternatively, a rigid frame may be attached to the occipital region side, and the occipital pad 52 may include an occipital pad holding mechanism having the same arrangement as that for the parietal region.

According to this embodiment, due to the arrangement of the temporal pads, a lateral deviation of the HMD can be prevented. Due to the arrangement of the temporal pad adjustment mechanism, the temporal regions can be pressed without any feeling of discomfort irrespective of the size of the head of the observer. Furthermore, the movable pressing members at three positions, i.e., the occipital, parietal, and temporal regions, can be simultaneously operated by operating one adjustment unit (and in particular by rotating the operation knob 41), thus allowing an easy operation at the time of mounting. In this case, since the parietal and temporal pads include the mechanisms for holding their positions, pressing forces more than necessary can be prevented from being applied. Since the mechanisms have compact arrangements, a compact, lightweight HMD can be provided.

Second Embodiment

Figure 8:
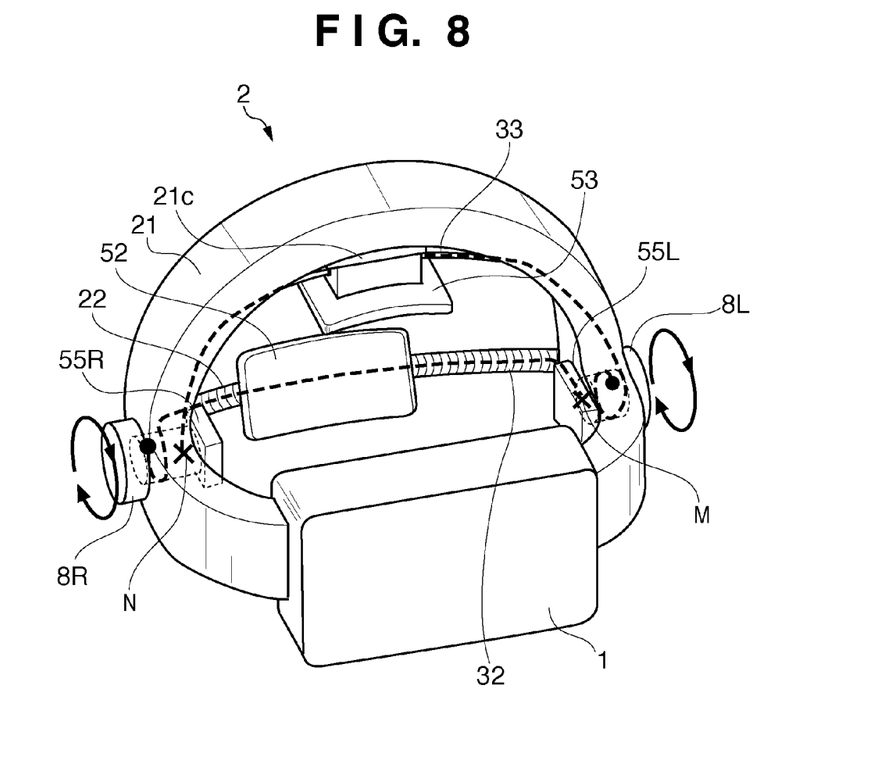
FIG. 8 is a perspective view of a head-mountable display according to the second embodiment.

An HMD according to the second embodiment will be described below with reference to FIG. 8. The same reference numerals in FIG. 8 denote the same components as those described in the first embodiment, and a detailed description thereof will not be repeated.

Right and left adjustment unit 8R and 8L, which serve as adjustment unit at the time of mounting, are pivotally attached to a rigid frame 21. One end of an occipital wire 32 whose length changes by an operation is attached to the right adjustment unit 8R, and one end of a parietal wire 33 is attached to the left adjustment unit 8L. The occipital wire 32 passes through an elastic tube 22 from the right adjustment unit 8R, and the other end thereof is attached to a left rear portion (at a connecting point M) of the rigid frame 21. On the other hand, one end of the parietal wire 33, whose length changes by an operation, is attached to the left adjustment unit 8L, and the parietal wire 33 passes through a parietal region of the rigid frame 21, and temporarily extends outside the rigid frame 21 from a hole 21a formed on the rigid frame 21. After that, the parietal wire 33 passes through a parietal pad 53, enters the rigid frame 21 again from an opposite hole 21b in the rigid frame 21, and is combined to a right rear portion (combining unit N). Thus, the right adjustment unit 8R can adjust the pressing force of an occipital pad 52, and the left adjustment unit 8L can adjust that of the parietal pad 53. Also, the right and left adjustment units 8R and 8L include mechanisms for adjusting pressing forces of right and left temporal pads 55R and 55L, respectively.

The structure of the right adjustment unit 8R will be described below with reference to FIGS. 9A and 9B. The right adjustment unit 8R serving as the adjustment unit includes an operation knob 81 as an operation member, and first and second rotation members which configure the operation member required to operate the right adjustment unit 8R. The right adjustment unit 8R includes, as the first rotation member, an indirect dial 82, which is coaxially arranged inside the operation knob 81. Also, the right adjustment unit 8R includes a first generation unit which generates a rotational force upon rotation of the indirect dial 82 as the first rotation member. The indirect dial 82 has a cam shaft 82a required to actuate a clutch 42. The operation principles of the clutch 42, a pulley 43, and a one-way clutch 44 are the same as those in the first embodiment.

When the indirect dial 82 is rotated, for example, clockwise, the cam shaft 82a rotates, and the clutch 42 having a cam groove 42a, which fits with the cam shaft 82a, moves in a horizontal direction (F1 side) along an axis of rotation of the indirect dial 82. When the clutch 42 moves to the F1 side, and is brought into contact with a frictional surface 43a of the pulley 43, the rotation of the indirect dial 82 is transmitted to the pulley 43. As a result, the occipital wire 32 is ready to be taken up. When the clutch 42 moves to the F1 side, the pulley 43 and one-way clutch 44 are brought into contact with each other, so as to allow the pulley 43 to rotate in only one direction and to restrict its reverse rotation. Thus, the position of the occipital pad 52 is held. On the other hand, when the indirect dial 82 is rotated, for example, counterclockwise, the clutch 42 moves to the L1 side upon rotation of the cam shaft 82a, and the pulley 42 is separated from the frictional surface 43a of the pulley 43. The pulley 43 is separated from the one-way clutch 44 to release the restriction of the rotation by the one-way clutch 44.

A clutch 83, herein referred to as a temporal clutch, as the second rotation member and a knob biasing spring 84 are arranged further inside the indirect dial 82. The right adjustment unit 8R includes a second generation unit which generates a linear force upon rotation of the temporal clutch 83 as the second rotation member. The temporal clutch 83 has a threaded portion 83a. The position of the temporal clutch 83 in the axial direction is restricted with respect to the indirect dial 82. The right temporal pad 55R includes a cushion 55a and temporal pad base 55b. The temporal pad base 55b has a threaded portion 55c, which is threadably combined to the aforementioned threaded portion 83a of the temporal clutch 83. The temporal pad base 55b has a fitting shape having a rotation lock function with respect to the rigid frame 21.

Figure 9A:
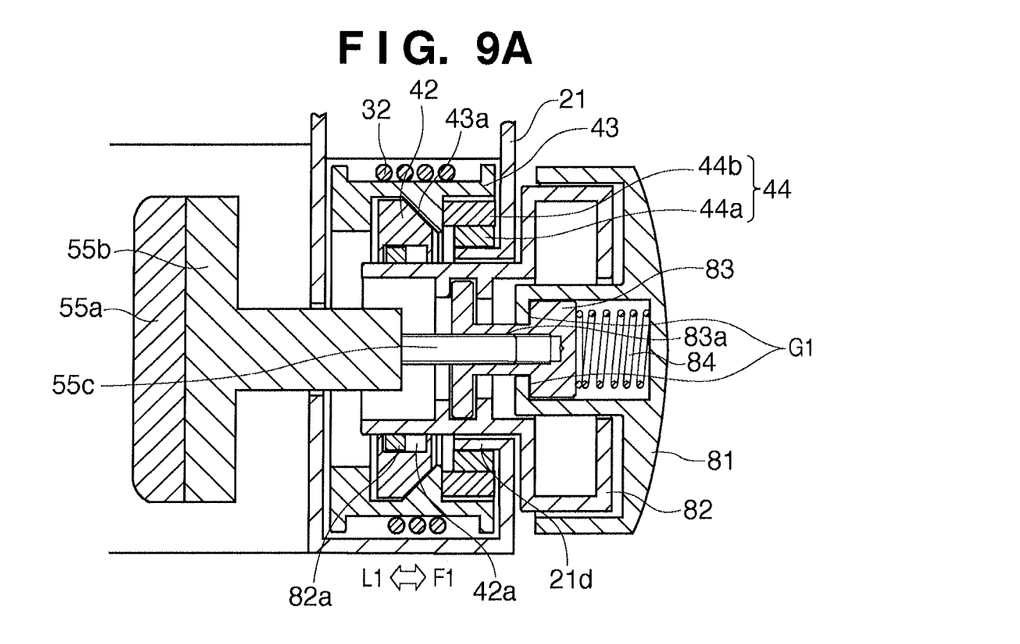
FIGS. 9A and 9B are sectional views of an adjustment unit of the head-mountable display according to the second embodiment.
Figure 9B:
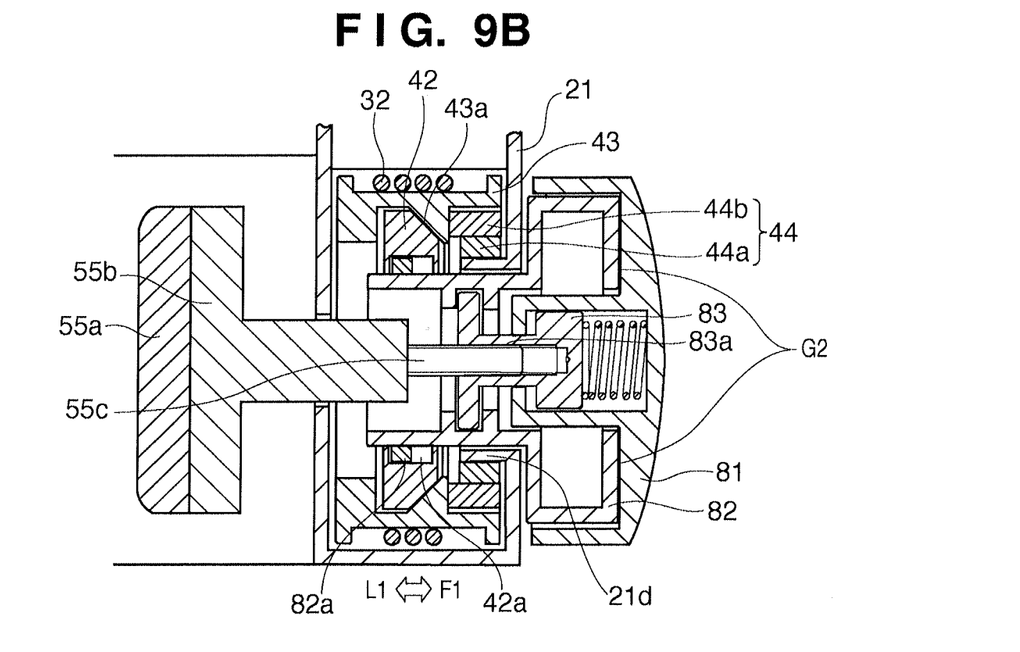

The knob biasing spring 84 presses the operation knob 81 and temporal clutch 83 against each other at a contact surface G1, to generate a friction that allows to transmit the rotation of the operation knob 81 to the temporal clutch 83 (FIG. 9A). For this reason, when the operation knob 81 is rotated, the temporal clutch 83 rotates, and the temporal pad base 55b moves straight. However, when the operation knob 81 is rotated while pressing it toward the rigid frame 21 side, the operation knob 81 is pressed against the indirect dial 82 (FIG. 9B). As a result, a friction that allows to transmit the rotation of the operation knob 81 to the indirect dial 82 is generated at a contact surface G2 between the operation knob 81 and indirect dial 82. With this friction, when the operation knob 81 is rotated while being pressed, the indirect dial 82 rotates, and the occipital wire 32 is taken up upon rotation of the pulley 43 in the manner described in the first embodiment. When the operation knob 81 is pushed, since the contact surface G1 between the operation knob 81 and temporal clutch 83 is separated, no force is transmitted to the temporal pad. For this reason, the right temporal pad 55R ceases to actuate. That is, the operation knob 81 includes a switching unit for transmitting the rotational force of the operation knob 81 to the indirect dial 82 or temporal clutch 83 via a frictional force.

A mechanism of the left adjustment unit 8L also has the same arrangement. That is, by changing the length of the wire 32 upon rotation of the first rotation member (indirect dial 82), the position of the parietal pad 53, which presses a parietal region, can be adjusted. Also, the second rotation member (temporal clutch 83) converts a rotational force into a linear force to allow adjustment of the position of the cushion 55a that presses a temporal region. This embodiment adopts the same operation members for the occipital and right temporal regions and for the parietal and left temporal regions. However, the present invention is not limited to such specific example. Furthermore, portions to be pressed by the rotational force and those to be pressed by converting the rotational force into the linear force are not limited to those exemplified in this embodiment.

According to the arrangement of this embodiment, since the observer can adjust the pressing forces on the occipital, parietal, and right and left temporal regions, respectively, an apparatus that fits the head shape of the observer and is free from any feeling of discomfort can be provided. Also, since the same operation members are adopted for the occipital and right temporal regions and for the parietal and left temporal regions to reduce the number of operation members, an apparatus that is easy to operate can be provided to the observer.

Third Embodiment

Figure 10:
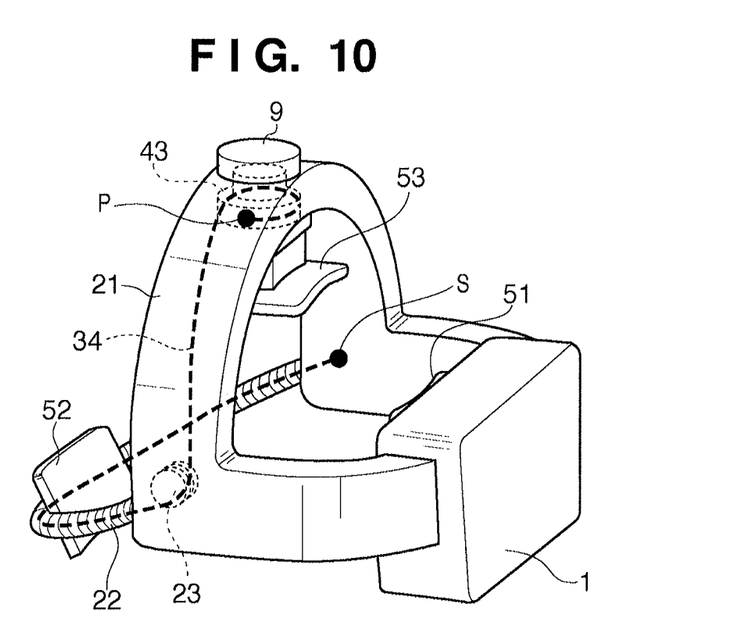
FIG. 10 is a perspective view of a head-mountable display according to the third embodiment.
Figure 11:
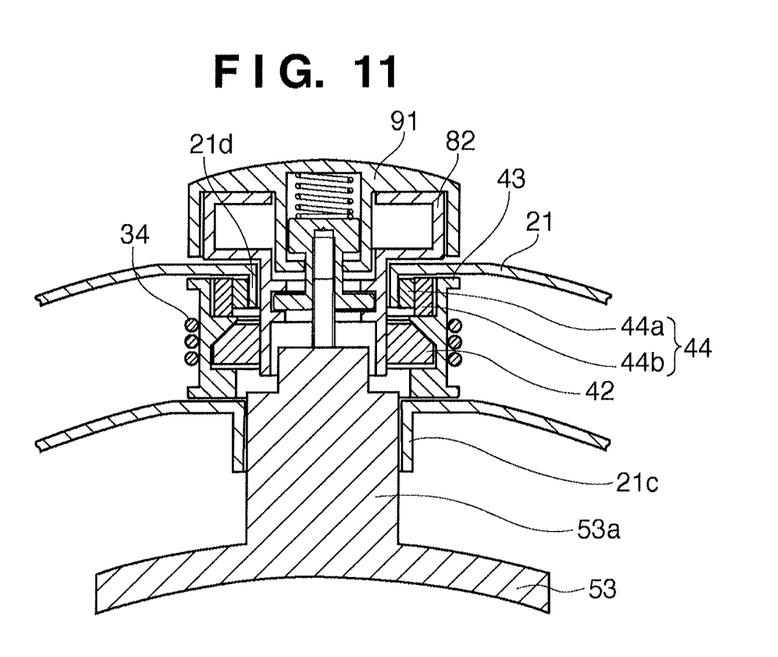
FIG. 11 is a sectional view of an adjustment unit shown in FIG. 10.

An HMD according to the third embodiment will be described below with reference to FIG. 10. The same reference numerals in FIG. 10 denote the same components as those described in the first and second embodiments, and a detailed description thereof will not be repeated. An adjustment unit 9 serving as an adjustment unit is arranged on a parietal region of a rigid frame 21. One end of a wire 34 is attached to the adjustment unit 9 (at connecting point P). The wire 34 passes through a right parietal region of the rigid frame 21 from the adjustment unit 9, then passes through an elastic tube 22 via a holding member 23, and the other end thereof is fixed to a left temporal region in the rigid frame 21 (at connecting point unit S). FIG. 11 is a sectional view of the adjustment unit 9. The adjustment unit 9 incorporates a shaft 21d, which fits with a one-way clutch 44, in the rigid frame 21, and the same mechanism as the right adjustment unit 8R used in the second embodiment. Then, upon rotation of an operation knob 91 of the adjustment unit 9, the wire 34 is taken up to adjust a pressing force of an occipital pad 52. Also, a parietal pad 53 moves in up-and-down directions based on the same operation principle as the right temporal pad 55R of the second embodiment, thus adjusting the position of the parietal pad 53.

The present invention is also applicable to the case in which a pressing force based on the rotational force of the operation knob is used for an occipital region, and a pressing force obtained by converting the rotational force into a linear force is used for a parietal region like in this embodiment.

According to this embodiment, since the parietal pad which receives the weight of the HMD is received by a thread in place of a tension of a wire, the weight of the HMD can be surely supported. Since the same operation member is adopted for the occipital and parietal pads, an HMD which is easy to operate, i.e., has high operability, can be provided.

A further aspect of the invention provides a head-mountable apparatus, forming a cavity into which the head of an observer is inserted in use, comprising:
a first pressing member configured to be movable into the cavity;
a second pressing member configured to be movable into the cavity; and
an adjustment unit adapted to move both the first pressing member and the second pressing member into the cavity, While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-152869, filed Jun. 26, 2009, which is hereby incorporated by reference herein in its entirety.

What is claimed is:

1. A head-mountable apparatus, having a structure forming a cavity between the head of an observer and the head-mountable apparatus when the observer wears the head-mountable apparatus, comprising:
a first pressing member that moves into the cavity, to apply pressure to a first portion of the head;
a second pressing member that moves into the cavity, to apply pressure to a second portion of the head different from the first portion of the head; and
a single adjustment unit that adjusts the pressure applied by both the first and second pressing members,
wherein the single adjustment unit comprises:
a rotatable operation member that generates a rotational force; and
a conversion unit that converts the rotational force generated on rotation of the rotatable operation member into a linear force in a horizontal direction along an axis of the rotation of the rotatable operation member,
wherein the first pressing member is moved into the cavity in a pressing direction orthogonal to the head by the rotational force, and the second pressing member is moved into the cavity in a pressing direction orthogonal to the head by the linear force,
wherein the operation member comprises a first rotation member, a second rotation member, a first generation unit adapted to generate a rotational force upon rotation of the first rotation member, and a second generation unit adapted to generate a linear force upon rotation of the second rotation member, the first pressing member moves in a pressing direction by the rotational force, and presses the first portion, and the second pressing member moves in a pressing direction by the linear force, and presses the second portion.

2. The apparatus according to claim 1, wherein the first pressing member is connected to the adjustment unit by an elongate member and wherein the elongate member retracts on rotation of the operation member.

3. The apparatus according to claim 2, wherein the elongate member is wound around a winding member on rotation of the operation member.

4. The apparatus according to claim 1, wherein the conversion unit comprises a screw thread.

5. The apparatus according to claim 1, wherein when a predetermined reaction is generated against the linear force, the conversion unit skips the conversion from the rotational force into the linear force by inserting a lock switch locking the conversion into the conversion unit.

6. The apparatus according to claim 1, further comprising a switching unit that switches an operation of the first generation unit and an operation of the second generation unit upon operation of the operation member by moving a transmission member between the first generation unit and the second generation unit.

7. The apparatus according to claim 1,
wherein the operation member is rotatable in a first position and a second position,
wherein when the operation member is rotated in the first position, the first pressing member is moved into the cavity in a pressing direction by the rotational force of the rotation member, and
wherein when the operation member is rotated in the second position, the conversion unit is converts the rotation force to linear force and the second pressing member is moved into the cavity in a pressing direction by the linear force.

8. The apparatus according to claim 1, further comprising a holding unit that holds a position of the first pressing member at a position, where the head is pressed in use, by applying a pressing force of not less than a predetermined pressing force,
wherein holding by the holding unit is released when the predetermined pressing force is released.

9. The apparatus according to claim 1, further comprising a third pressing member that moves into the cavity, to apply pressure to a third portion of the head when in use, wherein the adjustment unit adjusts the pressure applied by the third pressing member, to the head when in use, by moving the third pressing member into the cavity in a direction orthogonal to the head.

10. A head-mountable apparatus, having a structure forming a cavity between the head of an observer and the head-mountable apparatus when the observer wears the head-mountable apparatus, comprising:
a first pressing member that moves into the cavity, to apply pressure to a first portion of the head;
a second pressing member that moves into the cavity, to apply pressure to a second portion of the head different from the first portion of the head; and
a single adjustment unit that adjusts the pressure applied by both the first and second pressing members,
wherein the single adjustment unit comprises:
a rotatable operation member that generates a rotational force; and
a conversion unit that converts the rotational force generated on rotation of the rotatable operation member into a linear force in a horizontal direction along an axis of the rotation of the rotatable operation member,
wherein the first pressing member is moved into the cavity in a pressing direction by the rotational force, and the second pressing member is moved into the cavity in a pressing direction by the linear force,
wherein the adjustment unit is arranged on a temporal area of the observer's head when the observer's head is inserted in use,
wherein the operation member comprises a first rotation member, a second rotation member, a first generation unit adapted to generate a rotational force upon rotation of the first rotation member, and a second generation unit adapted to generate a linear force upon rotation of the second rotation member, the first pressing member moves in a pressing direction by the rotational force, and presses the first portion, and the second pressing member moves in a pressing direction by the linear force, and presses the second portion.

11. The apparatus according to claim 10, wherein the first pressing member is connected to the adjustment unit by an elongate member and wherein the elongate member retracts on rotation of the operation member.

12. The apparatus according to claim 11, wherein the elongate member is wound around a winding member on rotation of the operation member.

13. The apparatus according to claim 10, wherein the conversion unit comprises a screw thread.

14. The apparatus according to claim 10, wherein when a predetermined reaction is generated against the linear force, the conversion unit skips the conversion from the rotational force into the linear force by inserting a lock switch locking the conversion into the conversion unit.

15. The apparatus according to claim 10, further comprising a switching unit that switches an operation of the first generation unit and an operation of the second generation unit upon operation of the operation member by inserting a lock switch locking the conversion into the conversion unit.

16. The apparatus according to claim 10,
wherein the operation member is rotatable in a first position and a second position,
wherein when the operation member is rotated in the first position, the first pressing member is moved into the cavity in a pressing direction by the rotational force of the rotation member, and
wherein when the operation member is rotated in the second position, the conversion unit converts the rotation force to linear force and the second pressing member is moved into the cavity in a pressing direction by the linear force.

17. The apparatus according to claim 10, further comprising a holding unit that holds a position of the first pressing member at a position, where the head is pressed in use, by applying a pressing force of not less than a predetermined pressing force,
wherein holding by the holding unit is released when the predetermined pressing force is released.

18. The apparatus according to claim 10, further comprising a third pressing member that moves into the cavity, to apply pressure to a third portion of the head when in use, wherein the adjustment unit adjusts the pressure applied by the third pressing member, to the head when in use, by moving the third pressing member into the cavity in a direction orthogonal to the head.

* * * * *